United States Patent
McMillan et al.

(10) Patent No.: US 6,565,287 B2
(45) Date of Patent: May 20, 2003

(54) APPARATUS FOR SUPPRESSION OF VORTEX INDUCED VIBRATION WITHOUT AQUATIC FOULING AND METHODS OF INSTALLATION

(76) Inventors: David Wayne McMillan, 1502 Tulisa St., Houston, TX (US) 77536; Richard Bruce McDaniel, 2919 Blue Wind Ct., Houston, TX (US) 77084; Dean Leroy Henning, 3205 Hartledge Rd., Needville, TX (US) 77461; Donald Wayne Allen, 4323 Lake Kemp Ct., Richmond, TX (US) 77469; Howard Ray Mitschke, 9123 Lowercove Cir., Houston, TX (US) 77064

( * ) Notice: Subject to any disclaimer, the term of this patent is extended or adjusted under 35 U.S.C. 154(b) by 0 days.

(21) Appl. No.: 09/740,709

(22) Filed: Dec. 19, 2000

(65) Prior Publication Data

US 2002/0074133 A1 Jun. 20, 2002

(51) Int. Cl.[7] .................................................. F15D 1/10
(52) U.S. Cl. ..................... 405/211.1; 405/216; 114/243
(58) Field of Search ............................. 405/211, 211.1, 405/216, 195.1; 117/273

(56) References Cited

U.S. PATENT DOCUMENTS

| | | | | | |
|---|---|---|---|---|---|
| 3,884,173 | A | * | 5/1975 | Fabula | 114/243 |
| 4,398,487 | A | * | 8/1983 | Ortloff et al. | 114/243 |
| 4,415,293 | A | * | 11/1983 | Engel et al. | 405/211.1 |
| 5,410,979 | A | * | 5/1995 | Allen et al. | 114/243 |
| 5,423,631 | A | * | 6/1995 | Inoue | 405/211 |
| 5,549,417 | A | * | 8/1996 | Ju et al. | 405/211 |
| 5,722,340 | A | * | 3/1998 | Sweetman | 405/211 |
| 5,984,584 | A | * | 11/1999 | McMillan et al. | 405/211 |
| 6,019,549 | A | * | 2/2000 | Blair et al. | 405/216 |
| 6,048,136 | A | * | 4/2000 | Denison et al. | 405/211 |
| 6,067,922 | A | * | 5/2000 | Denison et al. | 114/243 |
| 6,347,911 | B1 | * | 2/2002 | Blair et al. | 405/211.1 |
| 6,401,646 | B1 | * | 6/2002 | Masters et al. | 114/243 |

* cited by examiner

Primary Examiner—Frederick L. Legman
(74) Attorney, Agent, or Firm—Gilbreth & Associates, P.C.; J. M. (Mark) Gilbreth; Mary A. Gilbreth

(57) ABSTRACT

Apparatus and methods for suppressing vortex-induced vibrations (VIV) of aquatic elements of underwater structures. The system includes use of a sleeve positioned around at least a portion of an aquatic element and at least one strake positioned along at least a portion of the length of the aquatic member. The apparatus further comprises copper to suppress the growth of aquatic organisms.

19 Claims, 2 Drawing Sheets

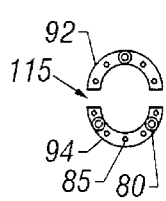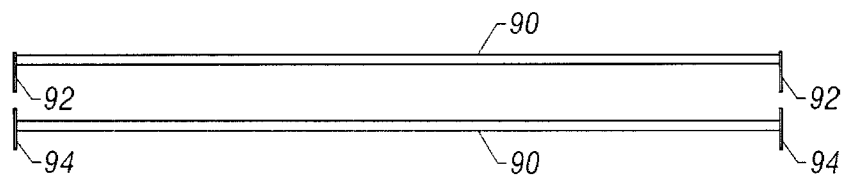
FIG. 8  FIG. 9
FIG. 10
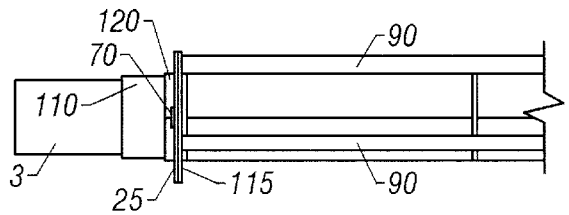
FIG. 11
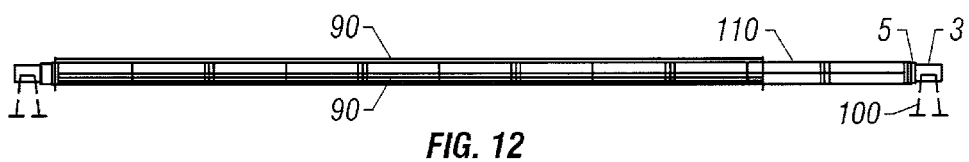
FIG. 12
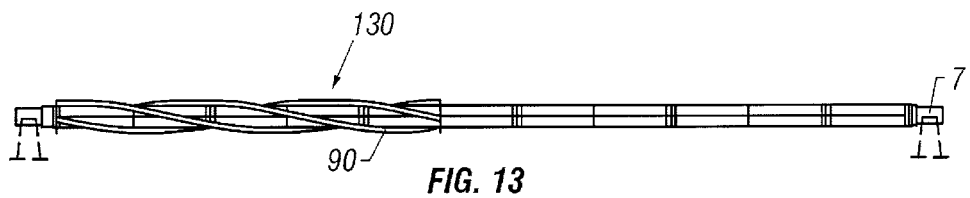
FIG. 13
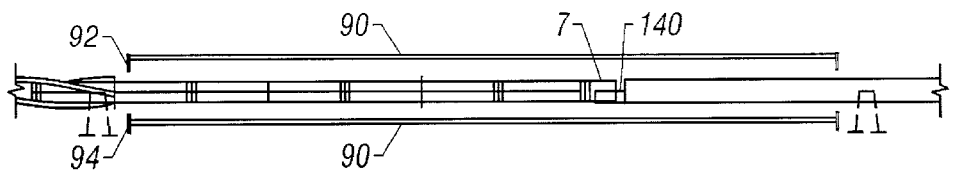
FIG. 14

US 6,565,287 B2

APPARATUS FOR SUPPRESSION OF VORTEX INDUCED VIBRATION WITHOUT AQUATIC FOULING AND METHODS OF INSTALLATION

BACKGROUND OF THE INVENTION

1. Field of the Invention

The present invention relates to apparatus and methods for suppressing vortex-induced vibrations (VIV). In another aspect, the present invention relates to apparatus and methods for suppressing VIV while also suppressing the growth of aquatic organisms on the VIV suppressing apparatus. In even another aspect, the present invention relates to apparatus for suppressing VIV comprised of copper for suppressing the growth of aquatic organisms on the surface of the apparatus.

2. Description of the Related Art

Whenever a bluff body, such as a cylinder, experiences a current in a fluid, it is possible for the body to experience vortex-induced vibrations (VIV). These vibrations are caused by oscillating hydrodynamic forces on the surface which can cause substantial vibrations of the structure, especially if the forcing frequency is at or near a structural natural frequency. The vibrations are largest in the transverse (to flow) direction; however, in-line vibrations can also cause stresses which are sometimes larger than those in the transverse direction.

Drilling for and/or producing hydrocarbons or the like from subterranean deposits which exist under a body of water exposes underwater drilling and production equipment to water currents and the possibility of VIV. Equipment exposed to VIV includes structures ranging from the smaller tubes of a riser system, anchoring tendons, or lateral pipelines to the larger underwater cylinders of the hull of a minispar or spar floating production system (hereinafter "spar").

Risers are discussed here as a non-exclusive example of an aquatic element subject to VIV. A riser system is used for establishing fluid communication between the surface and the bottom of a water body. The principal purpose of the riser is to provide a fluid flow path between a drilling vessel and a well bore and to guide a drill string to the well bore.

A typical riser system normally consists of one or more fluid-conducting conduits which extend from the surface to a structure (e.g., wellhead) on the bottom of a water body. For example, in the drilling of a submerged well, a drilling riser usually consists of a main conduit through which the drill string is lowered and through which the drilling mud is circulated from the lower end of the drill string back to the surface. In addition to the main conduit, it is conventional to provide auxiliary conduits, e.g., choke and kill lines, etc., which extend parallel to and are carried by the main conduit.

Also, the newly developed spar production facilities are used in aquatic environments of great depths. Aquatic environments is used here to describe water environments of any salinity. Strong water currents often occur at these greater depths in ocean environments. The hulls of spar production facilities, therefore, can be exposed to excessive vortex-induced vibrations.

Methods to reduce vibrations caused by vortex shedding from aquatic structures can operate by modifying the boundary layer of the flow around the structure to prevent the correlation of vortex shedding along the length of the structure. Examples of such methods include the inclusion of helical strakes around a structure, or axial rod shrouds and perforated shrouds.

The use of strakes and shrouds in aquatic environments exposes them to being colonized by aquatic animals and plants that anchor themselves to these structures. Mature growth of these organisms on strakes and shrouds changes the contours of these VIV suppression devices and can diminish their effectiveness in VIV suppression, and perhaps in some instances result in greater VIV. The location of these VIV suppression devices deep in aquatic environments makes it difficult to remove aquatic organisms. Aquatic organisms can be removed from VIV suppression devices by divers working from water craft, defined herein as any vehicle that can travel on or in water. After removal, the aquatic organisms immediately begin to re-colonize the structures.

However, in spite of the above advancements, there still exists a need in the art for improved apparatus and methods for VIV suppression.

There is another need in the art for apparatus and methods for strakes and other VIV suppression devices which resist the growth of aquatic organisms on their surfaces.

These and other needs in the art will become apparent to those of skill in the art upon review of this specification, including its drawings and claims.

SUMMARY OF THE INVENTION

It is an object of the present invention to provide for improved apparatus and methods for VIV suppression.

It is another object of the present invention to provide for apparatus and methods for strakes and other VIV suppression devices which resist the growth of aquatic organisms on their surfaces.

These and other objects of the present invention will become apparent to those of skill in the art upon review of this specification, including its drawings and claims.

According to one embodiment of the present invention, there is provided a system for suppressing VIV. The system generally includes a first flange, having a first set of two or more members, and a second flange having a second set of two or more members. The system further includes an elongated strake member with the elongated strake member connected to the first flange and the second flange. At least a portion of the system comprises copper in the range of about 1 wt % to about 100 wt %, based on the total weight of that portion. In a more specific embodiment of this embodiment, the system may also include an elongated sleeve positioned within the first and second flanges and a marine element positioned within the elongated sleeve.

According to another embodiment of the present invention, there is provided a method of modifying a structure intended to operate while at least partially immersed in an aquatic environment. The method generally includes arranging a plurality of elongated members around at least a portion of the structure, wherein at least a portion of the elongated members comprise copper in the range of about 1 wt % to about 100 wt % copper.

BRIEF DESCRIPTION OF THE DRAWINGS

FIG. 8 shows a schematic illustration of strake attachment flange 115, comprised of top half 92 and bottom half 94 with hole 80 used to anchor tubes 90.

FIG. 9 displays a schematic representation of strake attachment flange 115 attached at both ends of tubes 90.

FIG. 10 shows a schematic overview of riser 7 and tubes 90 are shown anchored at both of their ends to attachment flanges 92 and 94.

FIG. 11 portrays a magnified schematic view of strake flange 25 attached to strake attachment flange 115 with tubes 90 attached to flange.

FIG. 12 provides a schematic overview of riser 7 with strake flange 25 and attachment flange 115 with tubes 90 connected and encircling clad sleeves 35 and 55.

FIG. 13 provides a schematic overview riser joint 7 with sleeves 35 and 55 and with tubes 90 twisted into a helix.

FIG. 14 shows a schematic overview of apparatus and methods of adding additional clad sleeves 55 and tubes 90 across the abutted ends of two risers 7.

DETAILED DESCRIPTION OF THE INVENTION

The VIV suppression apparatus of the present invention generally includes protective coverings and VIV suppression devices for aquatic elements of underwater structures or subject to VIV, including but not limited to risers. The apparatus and methods of the present invention find utility with an aquatic element either in an assembly yard or a lay vessel, prior to being installed in an aquatic environment, or with the aquatic element in situ in an aquatic environment.

Figure 1:
FIG. 1 is a schematic illustration of a coated riser joint 7, comprised of riser joint 3 coated with and supporting riser coating 5.

Referring first to FIG. 1, shown is coated riser joint 7, comprised of riser joint 3 coated with and supporting riser coating 5. Riser joints are individual sections of tubing that can be connected end to end to create a riser of various lengths.

Figure 2:
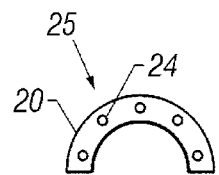
FIG. 2 shows a schematic illustration of strake flange 25 in frontal view, comprised of top half 20 and bottom half 22, each half defining multiple holes 24.
Figure 3:
FIG. 3 depicts a first clad sleeve 35, comprised of top half 30 and bottom half 32.

Referring next to FIGS. 2 and 3, shown is strake flange 25, comprising a set of top half 20 and bottom half 22, each half defining multiple holes 24. Also shown is first clad sleeve 35, comprised of top half 30 and bottom half 32. Upper and lower first clad sleeves 30 and 32 are fitted around one end of coated riser joint 7 if it is the first in a series of riser joints that require VIV suppression. Upper 30 and lower 32 first clad sleeves support respectively upper strake attachment flange 92 and bottom strake attachment flange 94.

Figure 4:
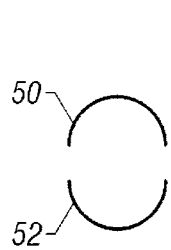
FIG. 4 shows a schematic illustration of a cross section of an additional clad sleeve 55 comprised of upper half 50 and lower half 52.
Figure 5:
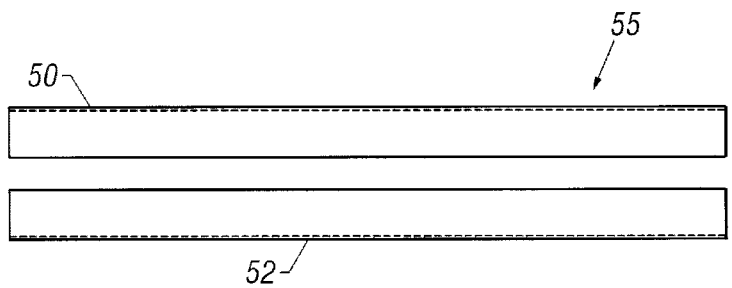
FIG. 5 shows a schematic illustration of lateral view of additional clad sleeve 55, comprised of upper half 50 and lower half 52.

Referring now to FIGS. 4 and 5, shown in cross section and laterally is additional clad sleeve 55, comprised of upper half 50 and lower half 52. Additional clad sleeve 55 does not support strake flange 25. Any number of additional clad sleeves 55 may be installed adjacent to first clad sleeve 35 on the side of first clad sleeve 35 that is away from the nearest end of riser joint 7.

Figure 6:
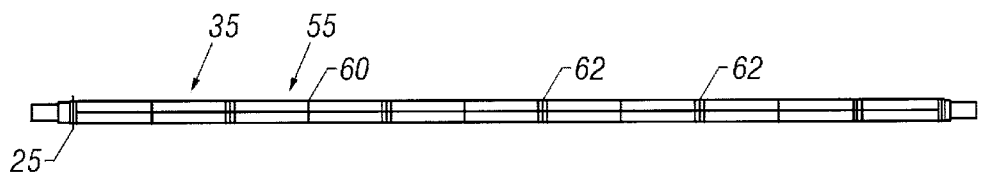
FIG. 6 provides a schematic overview of clad sleeves and strake flange 25 encircling coated riser 7.
Figure 7:
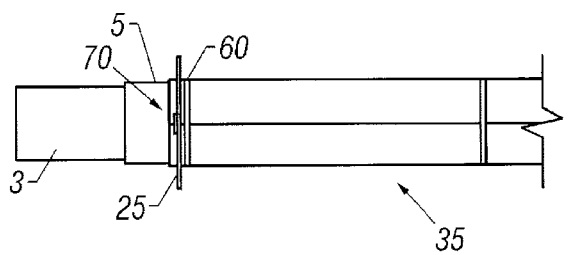
FIG. 7 provides a magnified schematic view of strake flange 25 positioned near one end of first clad sleeve 35 and supported thereby.

Referring now to FIGS. 6 and 7, one additional clad sleeve 55 is installed adjacent to and in contact with first clad sleeve 35 which is installed at one end of coated riser joint 7. More additional clad sleeves 35 may be installed down the remaining length of riser joint 7, adjacent to and in contact with each other at abutted ends 62, as is shown in FIG. 6. Further shown in FIGS. 6 and 7 are strake attachment flange 25 positioned near one end of first clad sleeve 35 and supported thereby. Strake flange 25 may be assembled from top half 20 and bottom half 22 with two or more bars 70 anchored through opposite holes 24, on each half. The bars may optionally be anchored with welding, preferably with rivets, even more preferably with bolts. Also shown in FIGS. 6 and 7 are compression straps 60 spaced at intervals along first sleeves 35 and additional sleeves 55 to anchor those sleeves to riser 7. In FIG. 6, a non-limiting example of the placement of compression straps 60 is shown with straps 60 positioned at both ends and in the middle of first sleeve 35 and additional sleeves 55.

Referring now to FIGS. 8 and 9, shown strake attachment flange 115, comprising a set of top half 92 and bottom half 94 attached at both ends of tubes 90, which are anchored to attachment flange 115 through holes 80 defined by attachment flange 115. Also defined by attachment 115 are multiple anchor holes 85.

Referring now to FIGS. 10 and 11, shown is riser 7 supported by yard braces 100 at both ends of riser 7. Tubes 90 are shown anchored at both of their ends to top attachment flanges 92 and to bottom attachment flanges 94. Strake attachment flange 115 with tubes 90 attached may be connected to strake flange 25 using the same anchoring methods used to anchor the top 20 and bottom 22 halves of strake flange 25. Optionally, bars 70 may be used to anchor strake flange 25 to strake attachment flange 115 using welding, preferably with rivets, even more preferably with bolts.

Referring now to FIG. 12, shown is riser 7 with strake flange 25 and attachment flange 115 connected and encircling clad sleeves 35 and 55, which in turn encircle riser 7, with tubes 90 attached to flange 115 at both ends of tubes 90.

Referring now to FIG. 13, shown are tubes 90 twisted into a helix forming strake 130, useful in VIV suppression. The helical arrangement of tubes 90 forming strake 130 is achieved by anchoring one strake flange 25 with tab 120 to clad sleeves 35 or 55 and applying torque to another strake flange 25 not anchored to clad sleeves 35 or 55 and supporting the other end of tubes 90. The direction of the torque applied to tubes 90 may be either clockwise or counterclockwise.

Referring now to FIG. 14, shown is a method of adding additional clad sleeves 55 across the abutted ends of two risers 7 using support mandrel 140 to hold the two abutted ends of two risers 7 together. Also shown is the installation of top attachment flange 92 with tubes 90 and the installation of bottom attachment flange 94 with tubes 90 to strake flange 25. Torque may be applied to the strake flange 25 at the end of tubing 90 opposite the end being attached to the prior torqued flange 25 along the length interconnected risers 7. Prior to applying torque to the un-torqued tubes 90, the strake flange 25 should be anchored to clad sleeves 35 or 55 with tab 120 to prevent the previously torqued tubes 90 from receiving additional torque being applied to the adjacent un-torqued tubing 90. If only one strake 130 is used, it is described as being a single start strake. However, if multiple strakes 130 are attached end to end as shown, with torque applied separately to each set of straight tubes 90, then the series of strakes 130 are described as being multiple start strakes.

Referring now to all of the previous Figures, at least a portion of the apparatus described is comprised of metal comprising copper. Preferably, at least a portion of the strake(s) comprise metal comprising copper. Most preferably, the portion of interest will be the portion of the apparatus or strake in contact with the water (i.e., the "contact surface." The portion requiring antifouling properties may comprise metals having a wide range of copper content provided that adequate antifouling is achieved, with the lower end of the range generally about 1 weight (wt) % based on the total weight of that portion, preferably about 60 wt %, more preferably about 75 wt %, even more preferably about 90 wt %, still more preferably about 95 wt %, and yet more preferably about 98 wt %.

The upper end of the range of copper content used is selected independently of the lower end to be greater than the lower end, with the upper end of the range generally about 60 wt %, preferably about 90 wt %, more preferably about 95 wt %, even more preferably about 98 wt %, yet more preferably 99 wt %, and even still more preferably 100 wt %.

While the methods and apparatus have been illustrated herein as being used with risers, it should be understood that the methods and apparatus are believed to have applicability to any structure underwater, whether permanent or temporary, fixed or mobile, in any type of aquatic environment, whether fresh, brackish, or salt water.

Further, while the methods and apparatus have been illustrated herein with elongated tubes, circular in cross-section, forming strakes, elongated members of any shape may be used, including but not limited to those with cross-sections that are rectangular, square, triangular, oval, arc-shaped, or spoke-shaped Finally, while the illustrative embodiments of the invention have been described with particularity, it will be understood that various other modifications will be apparent to and can be readily made by those skilled in the art without departing from the spirit and scope of the invention. Accordingly, it is not intended that the scope of the claims appended hereto be limited to the examples and descriptions set forth herein but rather that the claims be construed as encompassing all the features of patentable novelty which reside in the present invention, including all features which would be treated as equivalents thereof by those skilled in the art to which this invention pertains.

We claim:

1. A system comprising:

(a) a first flange;

(b) a second flange; and (e) an elongated strake member having a first and a second end;

wherein the first end of the elongated strake member is connected to the first flange, and wherein the second end of the elongated strake member is connected to the second flange; and wherein at least a portion of the system comprises copper in the range of about 60 wt % to about 100 wt %, based on the total weight of that portion.

2. The system of claim 1, further comprising:

(d) a marine element;

wherein the first and second flanges define an inner periphery, and wherein at least a portion of the marine element is positioned within the inner periphery.

3. The system of claim 2, wherein at least a portion of the system is comprised of copper in the range of about 90 wt % to about 100 wt %.

4. The system of claim 1, further comprising:

(d) an elongated sleeve;

wherein the first and second flanges define an inner periphery, and wherein at least a portion of the elongated sleeve is positioned within the inner periphery.

5. The system of claim 4 further comprising:

(e) a marine element;

wherein at least a portion of the marine element is positioned within the elongated sleeve.

6. The system of claim 4, wherein at least a portion of the system is comprised of copper in the range of about 75 wt % to about 100 wt %.

7. The system of claim 4, wherein at least a portion of the system is comprised of copper in the range of about 90 wt % to about 100 wt %.

8. The system of claim 4, wherein at least a portion of the system is comprised of copper in the range of about 95 wt % to about 100 wt %.

9. The system of claim 1, wherein at least a portion of the system is helically-shaped.

10. The system of claim 9, wherein at least a portion of the system is comprised of copper in the range of about 75 wt % to about 100 wt %.

11. The system of claim 9, wherein at least a portion of the system is comprised of copper in the range of about 90 wt % to about 100 wt %.

12. The system of claim 9, wherein at least a portion of the system is comprised of copper in the range of about 95 wt % to about 100 wt %.

13. A method of modifying a structure intended to operate while at least partially immersed in an aquatic environment, wherein the method comprises:

(a) arranging a plurality of elongated members around at least a portion of the structure, wherein at least a portion of the elongated member comprise copper in the range of about 60 wt % to about 100 wt %, based on the total weight of the elongated member.

14. The method of claim 13, further comprising:

(b) forming the plurality of elongated members into a helical shape around at least a portion of the structure.

15. The method of claim 14, further comprising, prior to step (a), arranging a sleeve around at least a portion of the structure, and then in step (a) arranging the plurality around the sleeve.

16. The method of claim 15, wherein the step prior to step (a) and the steps (a) and (b) are performed on a water craft.

17. The method of claim 13, wherein the elongated members are comprised of copper in the range of about 75 wt % to about 100 wt %.

18. The method of claim 13, wherein the elongated members are comprised of copper in the range of about 90 wt % to about 100 wt %.

19. The method of claim 13, wherein the elongated members are comprised of copper in the range of about 95 wt % to about 100 wt %.

* * * * *